United States Patent [19]
Johnston et al.

[11] Patent Number: 6,161,662
[45] Date of Patent: Dec. 19, 2000

[54] SUSPENSION DAMPER FOR MOTOR VEHICLE

[75] Inventors: Gary Lee Johnston, Pleasant Hill; Richard Edward Longhouse, Dayton; William Charles Kruckemeyer, Beavercreek; Michael Leslie Oliver, Xenia; Donelle Robert Mills, Dayton, all of Ohio

[73] Assignee: Delphi Technologies, Inc., Troy, Mich.

[21] Appl. No.: 09/270,559

[22] Filed: Mar. 16, 1999

[51] Int. Cl.[7] ........................................... F16F 9/50
[52] U.S. Cl. .................. 188/282.3; 188/298; 188/287.5; 188/297; 188/327.15
[58] Field of Search ...................... 188/195, 298, 188/282.5, 282.3, 297, 322.15, 282.1, 281, 266.2; 267/218, 64.17, 64.24, DIG. 1, DIG. 2

[56] References Cited

U.S. PATENT DOCUMENTS

| | | | |
|---|---|---|---|
| 4,502,673 | 3/1985 | Clark | 188/322.15 |
| 4,844,428 | 7/1989 | Margolis et al. | 188/318 |
| 5,094,325 | 3/1992 | Smith | 188/282.1 |
| 5,163,538 | 11/1992 | Derr et al. | 188/318 |
| 5,575,360 | 11/1996 | Gubitz et al. | 188/298 |
| 5,690,195 | 11/1997 | Kruckemeyer et al. | 188/322.15 |
| 5,706,919 | 1/1998 | Kruckemeyer et al. | 188/322.15 |
| 5,984,060 | 11/1999 | Clark et al. | 188/297 |
| 6,085,877 | 7/2000 | Robinson | 188/322.15 |

*Primary Examiner*—Matthew C. Graham
*Assistant Examiner*—Devon Kramer
*Attorney, Agent, or Firm*—Robert M. Sigler

[57] ABSTRACT

A monotube suspension damper including a cylinder tube having a fluid chamber and a gas chamber, a piston dividing the fluid chamber into a compression chamber and a rebound chamber, a primary fluid flow path across the piston including flow control valves which throttle fluid flow, a secondary fluid flow path across the piston parallel to the primary flow path including flow control valves which throttle fluid flow, and a tubular connecting rod on the cylinder tube connected to the piston. A valve spool is supported on the piston for linear translation between closed and open positions blocking and unblocking the secondary flow path. A control rod inside of the connecting rod is disposed between the valve spool and a flexible diaphragm exposed to pneumatic pressure in an expansible load leveling chamber between sprung and unsprung masses of the motor vehicle. As the pneumatic pressure in the expansible chamber varies, the control rod transfers flexure of the diaphragm to the valve spool to close the secondary flow path and increase the stiffness of the suspension damper as pneumatic pressure increases and to open the secondary flow path and decrease the stiffness of the suspension damper as pneumatic pressure decreases.

6 Claims, 2 Drawing Sheets

6,161,662

SUSPENSION DAMPER FOR MOTOR VEHICLE

TECHNICAL FIELD

This invention relates to a suspension damper for a motor vehicle.

BACKGROUND OF THE INVENTION

A suspension damper on a motor vehicle, commonly referred to as a shock absorber, reduces the amplitude of resilient suspension excursions between a sprung mass and an unsprung mass of the motor vehicle by converting into work a fraction of the kinetic energy of the sprung mass. Typically, a suspension damper includes a fluid-fill ed cylinder tube connected to the unsprung mass, a piston in the cylinder tube connected by a rod to the sprung mass, and valves on the piston which throttle fluid flow across piston during compression and rebound strokes of the suspension damper attributable to relative suspension excursions between the sprung and unsprung masses. In a twin-tube suspension damper, fluid in the cylinder tube displaced by the o connecting rod during a compression stroke of the suspension damper flows through a base valve to an annular reservoir around the cylinder tube and returns through the base valve during a rebound stroke of the suspension damper. In a monotube suspension damper, the volume of a gas chamber at an end of the cylinder tube opposite the connecting rod decreases and increases, respectively, during compression and rebound strokes of the suspension damper as the connecting rod enters and withdraws from the cylinder tube. A twin-tube suspension damper is adapted for pneumatic load leveling by the addition of an expansible chamber between the cylinder tube and the connecting rod which, when inflated with gas at elevated pressure, constitutes a pneumatic spring between the sprung and the unsprung masses. It has been proposed to equip a twin-tube suspension damper adapted for pneumatic load leveling with an external valve which reduces the stiffness of the suspension damper by shunting fluid directly from the cylinder tube to the annular reservoir as the pneumatic pressure in the expansible chamber decreases so that the stiffness of the suspension damper is maximum when the expansible chamber is inflated and minimum when the expansible chamber is exhausted to atmospheric pressure. The external valve, however, increases the size of the suspension damper and may be susceptible to damage from road hazards.

SUMMARY OF THE INVENTION

This invention is a new and improved monotube suspension damper including a cylinder tube divided by a gas cup into a fluid chamber and a gas chamber, a piston dividing the fluid chamber into a compression chamber and a rebound chamber, a primary fluid flow path across the piston including flow control valves which throttle fluid flow through the primary flow path, a secondary fluid flow path across the piston parallel to the primary flow path including flow control valves which throttle fluid flow through the secondary flow path, and a tubular connecting rod on the cylinder tube connected to the piston. A valve spool is supported on the piston for linear translation between a closed position blocking the secondary flow path and an open position unblocking the secondary flow path. A control rod inside of the connecting rod is disposed between the valve spool and a flexible diaphragm exposed to pneumatic pressure in an expansible load leveling chamber between a sprung mass and an unsprung mass of the motor vehicle. As the pneumatic pressure in the expansible chamber varies, the control rod transfers corresponding flexure of the diaphragm to the valve spool to close the secondary flow path and increase the stiffness of the suspension damper as pneumatic pressure increases and to open the secondary flow path and decrease the stiffness of the suspension damper as pneumatic pressure decreases.

DESCRIPTION OF THE PREFERRED EMBODIMENT

Figure 1:
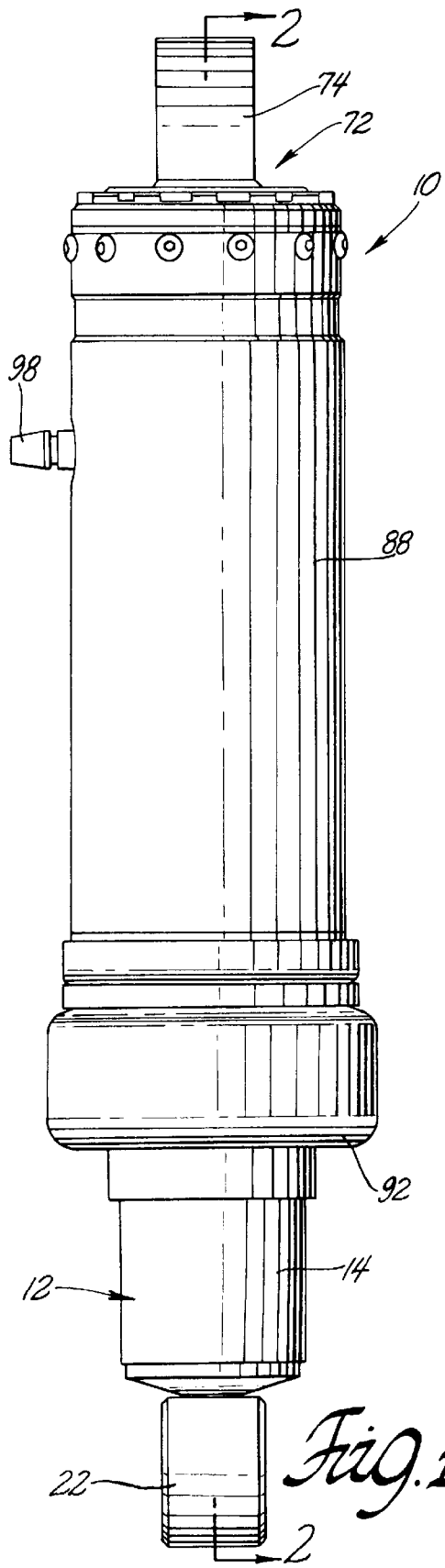
FIG. 1 is an elevational view a mono-tube suspension damper according to this invention.
Figure 2:
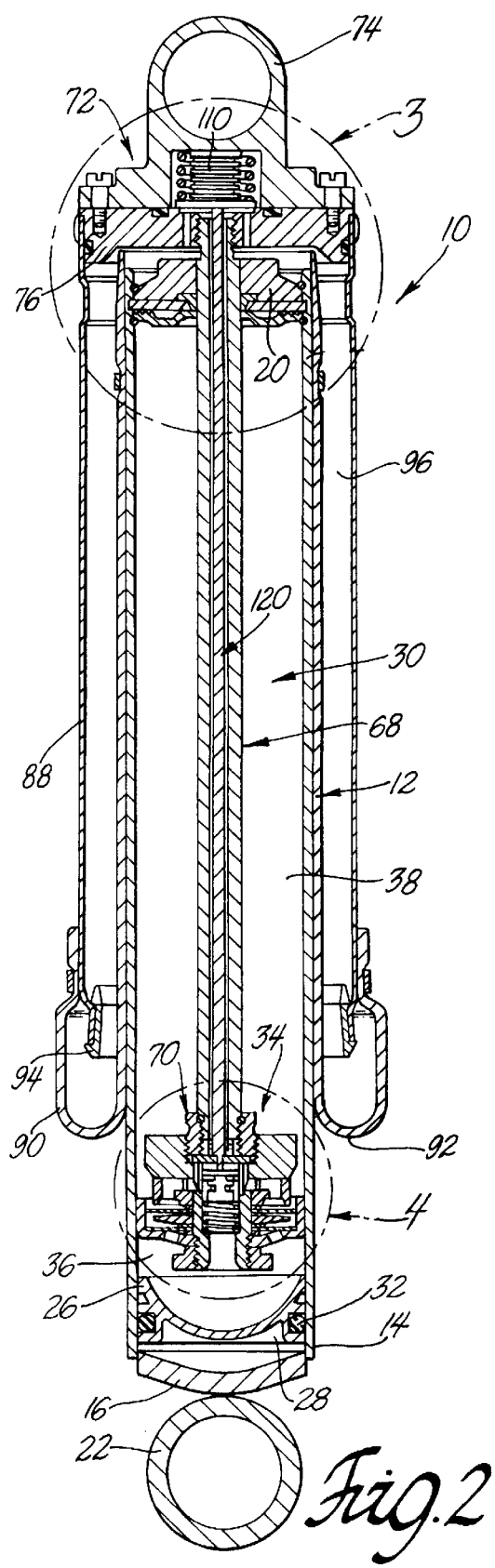
FIG. 2 is a sectional view taken generally along the plane indicated by lines 2—2 in FIG. 1.

Referring to FIGS. 1–2, a monotube suspension damper 10 according to this invention includes a cylinder tube 12 sealed closed at one end by a cap 16 and at the other end by a rod guide 20. The cap 16 is welded to the cylinder tube and has a ring 22 thereon which constitutes a lower mount whereat the suspension damper is usually connected to an unsprung mass, not shown. of a motor vehicle. The rod guide 20 is retained on the cylinder tube by a pair of retaining rings 24.

A gas cup 26 is supported in the cylinder tube 12 for back and forth linear translation and divides the cylinder tube into a gas-filled gas chamber 28 between the cup and the cap 16 and a fluid-filled fluid chamber 30 between the cup and the rod guide 20. A seal 32 on the gas cup prevents leakage between the gas and fluid chambers 28,30. A piston 34 is supported in the cylinder tube 12 for back and forth linear translation and divides the fluid chamber 30 into a compression chamber 36 between the piston and the gas cup 26 and a rebound chamber 38 between the piston and the rod guide 20.

Figure 4:
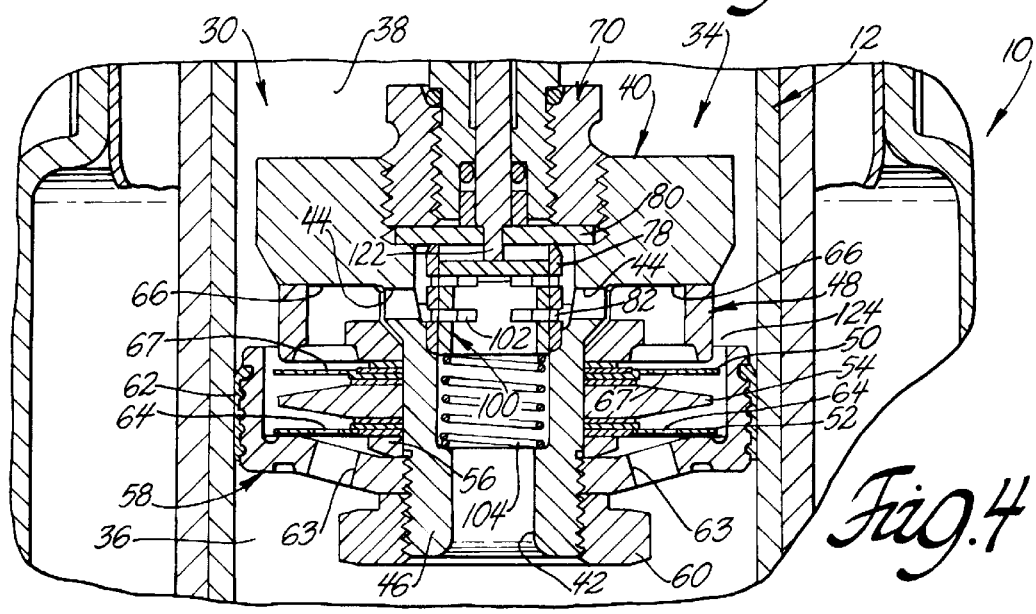
FIG. 4 is an enlarged view of the portion of FIG. 2 identified to the reference circle 4 in FIG. 2.

As seen best in FIG. 4, the piston 34 includes a piston body 40 having a center bore 42 therethrough, a plurality of lateral bores 44 into the center bore, and an external neck 46. An annular spacer 48 seats on the piston body around the neck 46 thereof. An annular first valve plate 50 and an annular second valve plate 52 are stacked on the piston body around the neck 46 thereof under the annular spacer 48 and separated by a beveled washer 54. A second washer 56 and a valve cup 58 are stacked on the piston body around the neck 46 thereof under the valve plate 52 and retained on the piston body by a nut 60 on an outside screw thread on the neck 46. A schematically represented seal 62 on the valve cup 58 faces the wall of the cylinder tube 12 and cooperates therewith in minimizing leakage of fluid around the piston between the compression and rebound chambers 36,38.

The valve cup 58 is perforated by a plurality of large apertures 63. The second valve plate 52 seats on the valve cup over the apertures 63 and is perforated by a plurality of small apertures 64. The first valve plate 50 is spaced or separated from the annular spacer 48 and overlaps a plurality of passages 66 in the annular spacer. The first valve plate is perforated by a plurality of small apertures 67.

Figure 3:
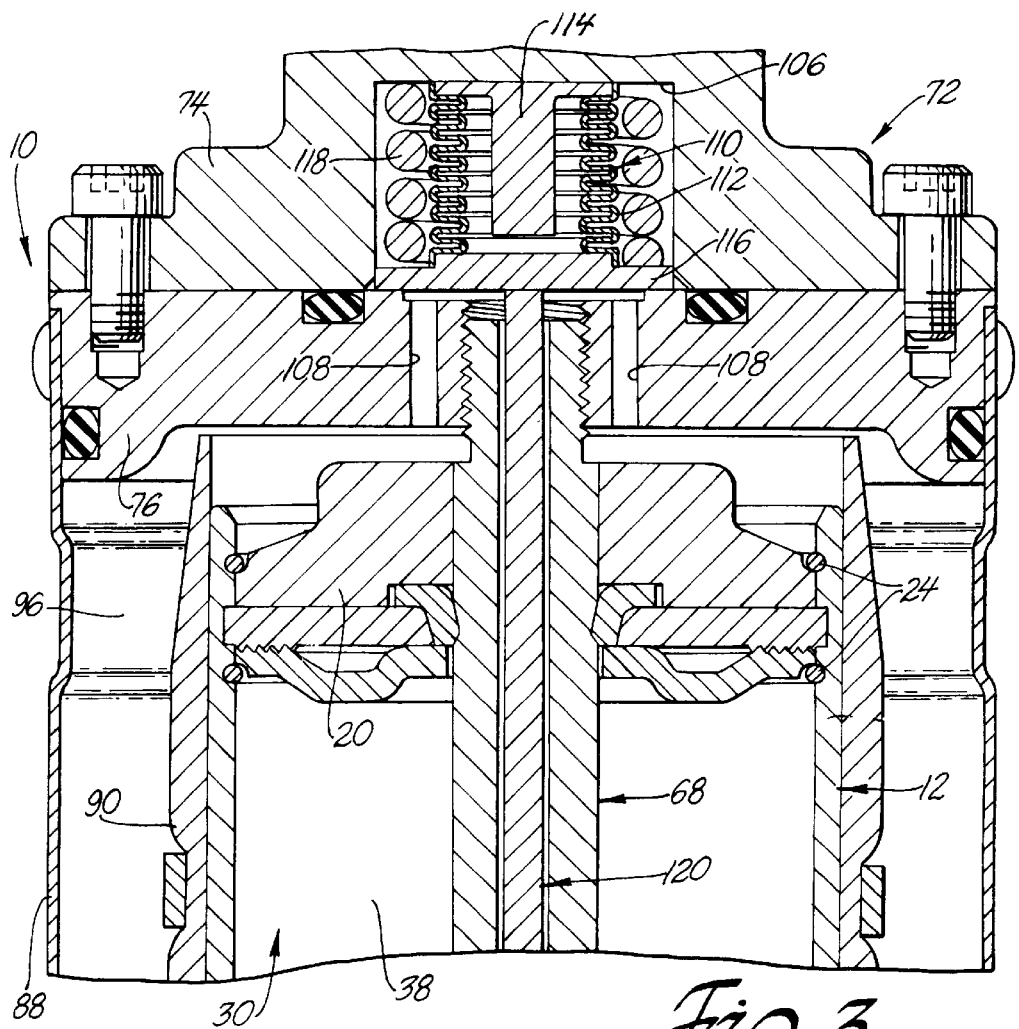
FIG. 3 is an enlarged view of the portion of FIG. 2 identified by the reference circle 3 in FIG. 2.

As seen best in FIGS. 2–3, a tubular connecting rod 68 is supported in the rod guide 20 for back and forth linear translation. The connecting rod is attached at an inboard end thereof to the piston body 40 in the center bore 42 by a tubular nut 70 for back and forth linear translation as a unit with the piston 34. A rod end fitting 72 is rigidly attached to an outboard end of the connecting rod 68 beyond the rod guide 20 and includes a ring 74 and a seal block 76 bolted to the ring. The ring 74 constitutes an upper mount whereat the suspension damper 10 is usually connected to a sprung mass, not shown, of the motor vehicle.

A valve sleeve 78, FIG. 4, is captured in the center bore 42 of the piston body by a flat disc 80 and by the tubular nut 70. The valve sleeve is perforated by a plurality of apertures 82 in flow communication with the center bore 42 and with the lateral bores 44 in the piston body. The lateral bores 44, in turn, are in flow communication with the passages 66 in the annular spacer 48.

The suspension damper 10 is part of a motor vehicle pneumatic load leveling system and, to that end, further includes a rigid tubular skirt 88 around the cylinder tube attached at one end to the seal block 76 of the rod end fitting 72. A flexible sleeve 90 is clamped to the skirt 88 aver an open end thereof and to the cylinder tube 12 around the rod guide 20. A rolling lobe 92 is defined on the flexible sleeve 90 where it loops from outside of the rigid skirt into the annulus between the rigid skirt and the cylinder tube. The rolling lobe rolls back and forth along the length of the cylinder tube during compression and rebound strokes of the suspension damper. A collar 94 on the rigid skirt guides the flexible sleeve into and out of the annulus between the rigid skirt and the cylinder tube.

The flexible sleeve 90 cooperates with the rigid skirt 88, the rod guide 20, and the rod end fitting 72 in defining an expansible pneumatic chamber 96 between the sprung mass of the motor vehicle connected the rod end fitting and the unsprung mass of the motor vehicle connected to the cylinder tube. Gas, e.g. air, at elevated pressure is introduced into the expansible chamber 96 through a valve stem 98 on the rigid skirt. When the expansible chamber is inflated, it constitutes a pneumatic spring between the sprung and unsprung masses of the motor vehicle having a stiffness which increases as the pneumatic pressure in the expansible chamber increases.

As seen best in FIG. 4, an inverted cup-shaped valve spool 100 is supported in the valve sleeve 78 on the piston body below the disc 80 for back and forth linear translation and includes a plurality of slots 102. In an open position of the valve spool, FIG. 4, the slots 102 register with the apertures 82 in the valve sleeve. In a closed position of the valve spool, not shown, the slots 102 are separated longitudinally from the apertures 82 so that the latter are blocked by the side of the valve spool. A spring 104 on the piston body biases the valve spool toward its closed position.

As seen best in FIG. 3, the ring 74 and the seal block 76 of the rod end fitting 72 cooperate in defining a diaphragm chamber 106 exposed to the expansible chamber 96 through a plurality of passages 108 in the seal block. A diaphragm 110 in the diaphragm chamber includes a convoluted bellows 112 sealed against the diaphragm chamber around a stop 114 and a reaction plate 116 on the bellows. The reaction plate is biased against a side of the diaphragm chamber 106 by a spring 118 around the bellows. A slender control rod 120 is supported inside of the tubular connecting rod 68 for back and forth linear translation and connected at an outboard end thereof to the reaction plate 116 for linear translation as a unit with the reaction plate. A reduced diameter inboard end 122, FIG. 4, of the control rod traverses the disc 80 on the piston body through an aperture in the disc and bears against an end of the valve spool 100.

A primary fluid flow path across the piston 34 includes the large apertures 63 in the valve cup 58 and an annular clearance 124, FIG. 4, between the valve cup and the annular spacer 48. During a compression stroke of the suspension damper 10, fluid flows through the primary flow path from the compression chamber 36 to the rebound chamber 38 with only negligible obstruction because the pressure gradient across the second valve plate 52 induces flexure thereof off of the valve cup. During a rebound stroke of the suspension damper, fluid flow through the primary flow path from the rebound chamber 38 to the compression chamber 36 is substantially obstructed by the small apertures 64 in the second valve plate 52 which is thrust against the valve cup by the pressure gradient thereacross.

A secondary fluid flow path across the piston 34 includes the center bore 42 and the lateral bores 44 in the piston body, the apertures 82 in the valve sleeve 78, the passages 66 in the annular spacer 48, and the annular gap 124 between the valve cup and the annular spacer. During a compression stroke of the suspension damper 10 with the valve spool 100 in its open position, fluid flows through the secondary flow path from the compression chamber to the rebound chamber with only negligible obstruction because the pressure gradient across the first valve plate 50 induces flexure thereof further away from the annular spacer 48. During a rebound stroke of the suspension damper with the valve spool in its open position, fluid flow through the secondary flow path from the rebound chamber to the compression chamber is substantially obstructed by the small apertures 67 in the first valve plate 50 which is thrust against the annular spacer over the passages 66 by the pressure gradient across the first valve plate. When the valve spool 100 is in its closed position, not shown, fluid flow through the secondary flow path is blocked during both compression and rebound strokes of the suspension damper.

In operation, when the load on the sprung mass of the motor vehicle is in a range in which load leveling is not required, the expansible chamber 96 is exhausted to atmospheric pressure. In that circumstance, the spring 118 seats the reaction plate 116 of the diaphragm against the end of the diaphragm chamber and the control rod 120 retains the valve spool 100 in its open position, FIG. 4, against the bias of the spring 104 so that the secondary fluid flow path is unblocked. Accordingly, during both compression and rebound strokes of the suspension damper, fluid flows through both of the primary and the secondary fluid flow paths with negligible throttling during the compression stroke and significant throttling during the rebound stroke so that the suspension damper is stiffer during the rebound stroke than during the compression stroke.

When the load on the sprung mass of the motor vehicle is in a range in which load leveling is required, gas at elevated pressure is introduced into the expansible chamber 96 through the valve stem 98 and reacts against the diaphragm 110 through the passages 108 in the seal block 76. The corresponding pressure gradient across the diaphragm flexes the diaphragm and lifts the reaction plate 116 from the end of the diaphragm chamber until the reaction plate seats on the stop 114. The corresponding linear translation of the control rod 120 is transferred to the valve spool 100 by the spring 104 which maintains the valve spool in contact with the inboard end 122 of the control rod. Accordingly, as pneumatic pressure in the expansible chamber 96 increases, the valve spool 100 translates linearly from its open position to its closed position.

During compression and rebound strokes o f the suspension damper 10 with the valve spool 100 in its closed position, fluid flows back and forth through the primary fluid flow path as described above. Fluid flow through the secondary fluid flow path, however, is completely blocked by the valve spool 100 which covers the apertures 82 in the valve sleeve 78. The total fluid flow across the piston which was divided between the primary and secondary flow paths when the valve spool was in its open position is now forced through only the primary flow path. The pressure gradient across the small apertures 64 in the second valve plate 52 during a rebound stroke of the suspension damper, therefore, increases so that the suspension damper is relatively more stiff with the valve spool in its closed position than with the valve spool in its open position.

When the load on the sprung mass of the motor vehicle is reduced and load leveling is not required, the pneumatic pressure in the expansible chamber 96 is exhausted to atmospheric pressure. The spring 118 then reseats the reaction plate 116 of the diaphragm 110 on the end of the diaphragm chamber 106 and the control rod 120 returns the valve spool 100 to its open position so that the total fluid flow across the piston 34 is again divided between the primary and secondary fluid flow paths. The suspension damper 10, therefore, responds to increasing pneumatic pressure in the expansible load leveling chamber 96 by becoming relatively more stiff and to decreasing pneumatic pressure in the expansible load leveling chamber by becoming less stiff.

What is claimed is:

1. A monotube suspension damper for a motor vehicle including:

a cylinder tube having a gas cup therein dividing the cylinder tube into a gas-filled gas chamber and a fluid-filled fluid chamber, a piston supported in the cylinder tube for back and forth linear translation and dividing the fluid chamber into a compression chamber facing the gas cup and a rebound chamber on the opposite side of the piston from the compression chamber, a piston rod supported on the cylinder tube for back and forth linear translation having an inboard end connected to the piston for linear translation as a unit therewith and an outboard end outside of the cylinder tube, a passage means operative to define a primary fluid flow path across the piston between the compression chamber and the rebound chamber and a secondary fluid flow path across the piston parallel to the primary fluid flow path, and a throttling valve means operative to throttle fluid flow through each of the primary and the secondary fluid flow paths during a rebound stroke of the suspension damper without significantly obstructing fluid flow through each of the primary and the secondary fluid flow paths during a compression stroke of the suspension damper, characterized in that the suspension damper further comprises:

a valve means on the piston having a closed position blocking the secondary fluid flow path and an open position unblocking the secondary fluid flow path, and a control means operative in response to an increasing pneumatic pressure in an expansible pneumatic load leveling chamber between a sprung mass of the motor vehicle and an unsprung mass of the motor vehicle to actuate the valve means from the open position thereof to the closed position thereof thereby to increase the stiffness of the suspension damper as the pneumatic pressure in the expansible pneumatic load leveling chamber increases.

2. The monotube suspension damper for a motor vehicle recited in claim 1 wherein the valve means comprises:

a valve sleeve means on the piston having an aperture therein in series flow communication with secondary fluid flow path, and a valve spool supported in the valve sleeve means for linear translation between an open position in which an aperture in the valve spool registers with the aperture in the valve sleeve means so that the secondary fluid flow path is unblocked and a closed position in which the aperture in the valve spool is separated from the aperture in the valve sleeve means so that a side of the valve spool closes the aperture of the valve sleeve means and blocks the secondary fluid flow path.

3. The monotube suspension damper for a motor vehicle recited in claim 2 wherein the control means comprises:

a rod end fitting means on the the pistol rod at the outboard end thereof, a diaphragm chamber in the rod end fitting means, a diaphragm in the diaphragm chamber having a reaction plate thereon resiliently biased against a side of the diaphragm chamber, a passage means in the rod end fitting means operative to expose one side of the diaphragm to the pneumatic pressure in the expansible pneumatic load leveling chamber so that the reaction plate is separated from the end of the diaphragm chamber as the pneumatic pressure in the expansible pneumatic load leveling chamber increases, and a motion transferring means operative to connect the reaction plate on the diaphragm means to the valve spool so that the valve spool is moved from the open position thereof to the closed position thereof concurrent with separation of the reaction plate from the side of the diaphragm chamber.

4. The monotube suspension damper for a motor vehicle recited in claim 3 wherein the motion transferring means comprises:

a passage in the piston rod between the outboard end thereof and inboard end thereof, a control rod supported in the passage in the piston rod for back and forth linear translation, a first connecting means operative to connect the control rod at an outboard end thereof to the reaction plate for linear translation as a unit with reaction plate, and a second connecting means operative to connect the control rod at an inboard end thereof to the valve spool so that the valve spool translates linearly as a unit with the control rod.

5. The monotube suspension damper for a motor vehicle recited in claim 4 wherein the second connecting means comprises:

a spring on the piston operative to resiliently bias the valve spool against the inboard end of the control rod.

6. The monotube suspension damper for a motor vehicle recited in claim 5 wherein the expansible pneumatic load leveling chamber between the sprung mass of the motor vehicle and the unsprung mass of the motor vehicle comprises:

a rigid tubular skirt having a closed end connected to the rod end fitting means on the piston rod at the outboard end thereof and an open end around the cylinder tube, and a flexible sleeve clamped at a first end thereof to the rigid tubular skirt around the open end of the rigid tubular skirt and at a second end thereof to the cylinder tube with a rolling lobe between the first and the second ends of the flexible sleeve where the flexible sleeve loops in to an annulus between the rigid tubular skirt and the cylinder tube.

\* \* \* \* \*